May 10, 1927.
H. R. SHEARER
AUTOMOBILE LIGHT
Filed Feb. 7, 1923
1,627,669
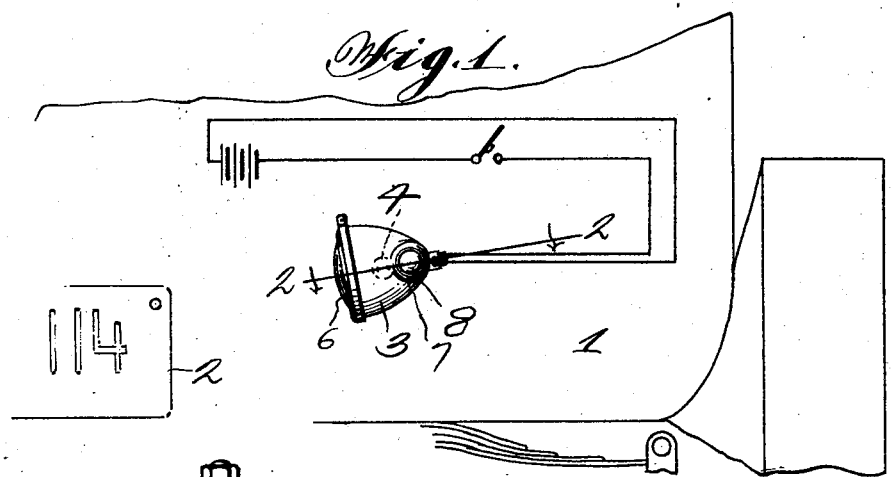
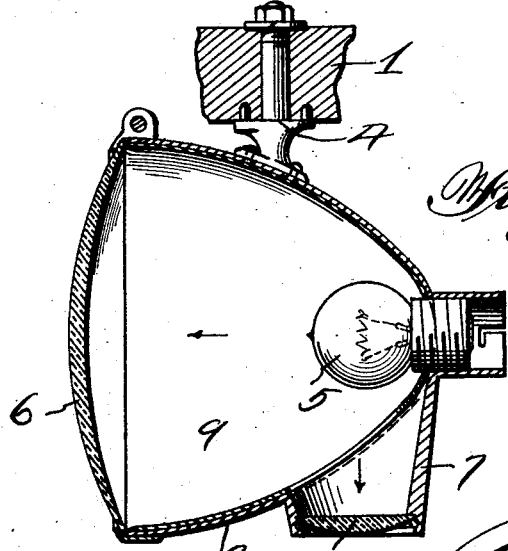
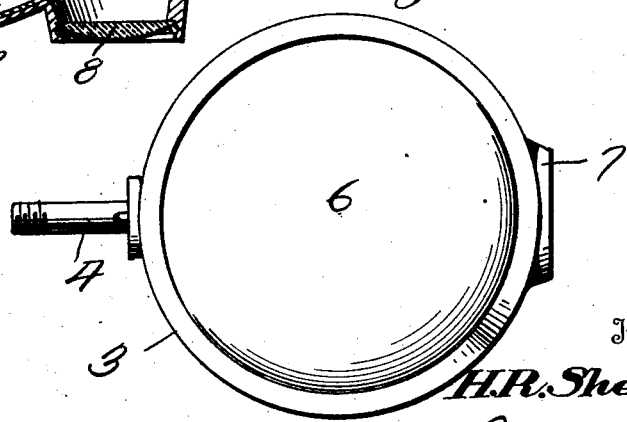
Inventor
H. R. Shearer
By D. Swift
Attorney Patented May 10, 1927.

1,627,669

UNITED STATES PATENT OFFICE.

HARRY R. SHEARER, OF DORENA, OREGON.

AUTOMOBILE LIGHT.

Application filed February 7, 1923. Serial No. 617,522.

The invention relates to automobile lights, and has for its object to provide a device of this character adapted to be secured to the rear end of the automobile, and provided with means whereby light rays will be projected transversely towards the left hand side of the automobile onto the license tag, and to the left of the automobile where it will only be necessary for the operator to look rearwardly to ascertain if the light is burning. Also to provide the rear side of the lamp with a red lens for projecting light rays rearwardly and forming a tail light for signalling approaching vehicles from the rear.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a view in elevation of a portion of a rear end of an automobile, showing the light applied thereto.

Figure 2 is a sectional view through the lamp taken on line 2—2 of Figure 1.

Figure 3 is a side elevation of the lamp.

Referring to the drawing the numeral 1 designates the rear end of a conventional form of automobile and 2 a license tag carried thereby. At the present time vehicles are provided with tail lights, constructed in such a manner that it is necessary for the operator of the automobile to get out of his machine and go to the rear of the machine to ascertain if the tail light is lighted. Also no means is provided for illuminating the license tag 2. To obviate the above difficulty the lamp 3 is provided, which lamp is provided with a post 4, which may be secured to the rear end of the vehicle in any suitable manner, however the lamp is transversely disposed in relation to the automobile and positioned whereby light from the electric lamp 5 therein will pass through a lens 6, and reflect on the tag 2, and also be projected onto the roadway to the left side of the automobile where it can be easily observed by the operator without leaving his seat, and consequently can easily ascertain if the lamp 5 is lighted. Extending rearwardly from the lamp 3 is a projection 7, which projection is provided with a red lens 8, visible from the rear, and forming means for signalling approaching vehicles from the rear, however it will be seen that the light rays which pass through the lens 8 are from the same electric lamp, and consequently if the operator looks to the left of the machine and does not see the light upon the roadway, he will know that the lamp 5 is out and consequently the tail light is not showing.

The lamp 3 is provided with a conventional form of reflector 9, which reflector forms reflecting means for light rays through the lens 6, and also through the lens 8, thereby obviating the use of two reflectors.

From the above it will be seen that a rear light is provided for an automobile, which light will, from a single bulb, illuminate the roadway to the left of the vehicle, the license tag and will project light rays through a colored lens forming the tail light of the vehicle. It will also be seen that the device is simple in construction and may be easily and quickly applied to the vehicle without modifying the construction thereof.

The invention having been set forth what is claimed as new and useful is:—

The combination with an automobile lamp casing tapering in size towards its rear end, one end of said lamp casing being provided with a lens, an electric lamp in the reduced end of said casing, of an integral relatively small extension casing carried by the reduced rear end of the lamp casing at a right angle to the axis of the lamp casing relatively close to the electric lamp and in a position whereby light rays from the lamp will pass outwardly therefrom at a right angle to the axis of the lamp, a lens carried by the outer end of the auxiliary casing and a supporting member carried by the casing at the opposite side thereof to the auxiliary extension casing and in the plane of the extension casing.

In testimony whereof I have signed my name to this specification.

HARRY R. SHEARER.